C. J. GUSTAFSON.
GEAR SHIFT LEVER LOCK.
APPLICATION FILED DEC. 19, 1914.
1,331,759.
Patented Feb. 24, 1920
3 SHEETS—SHEET 2.
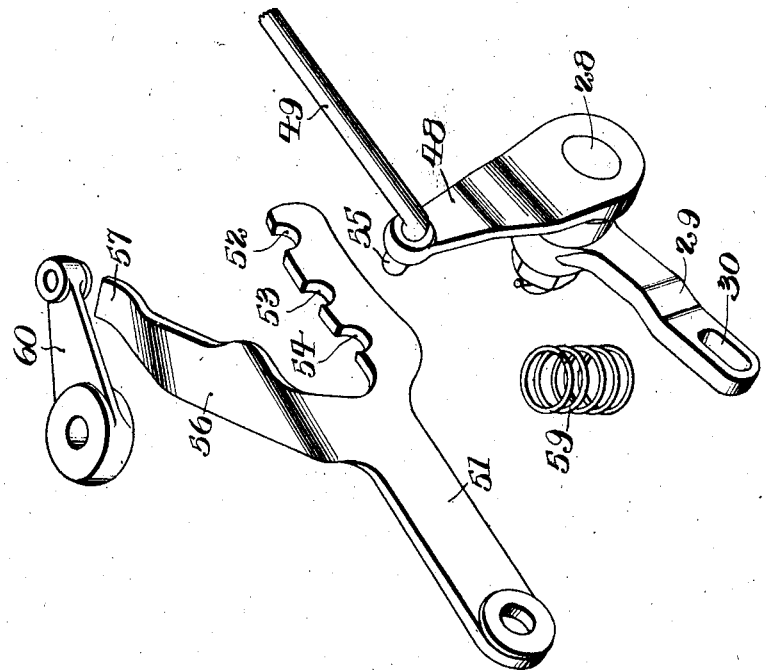
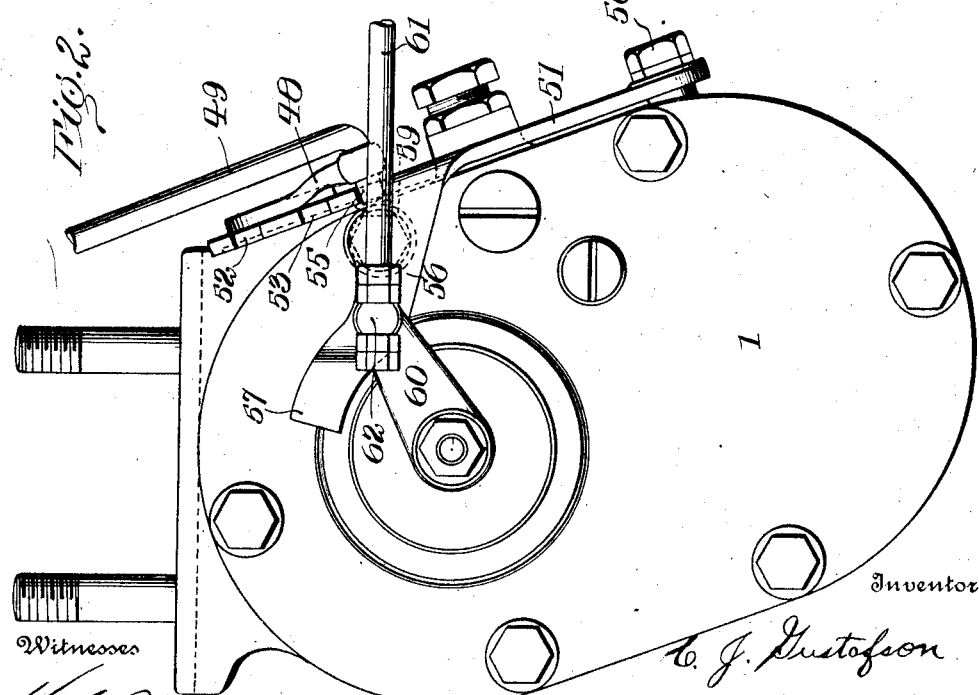

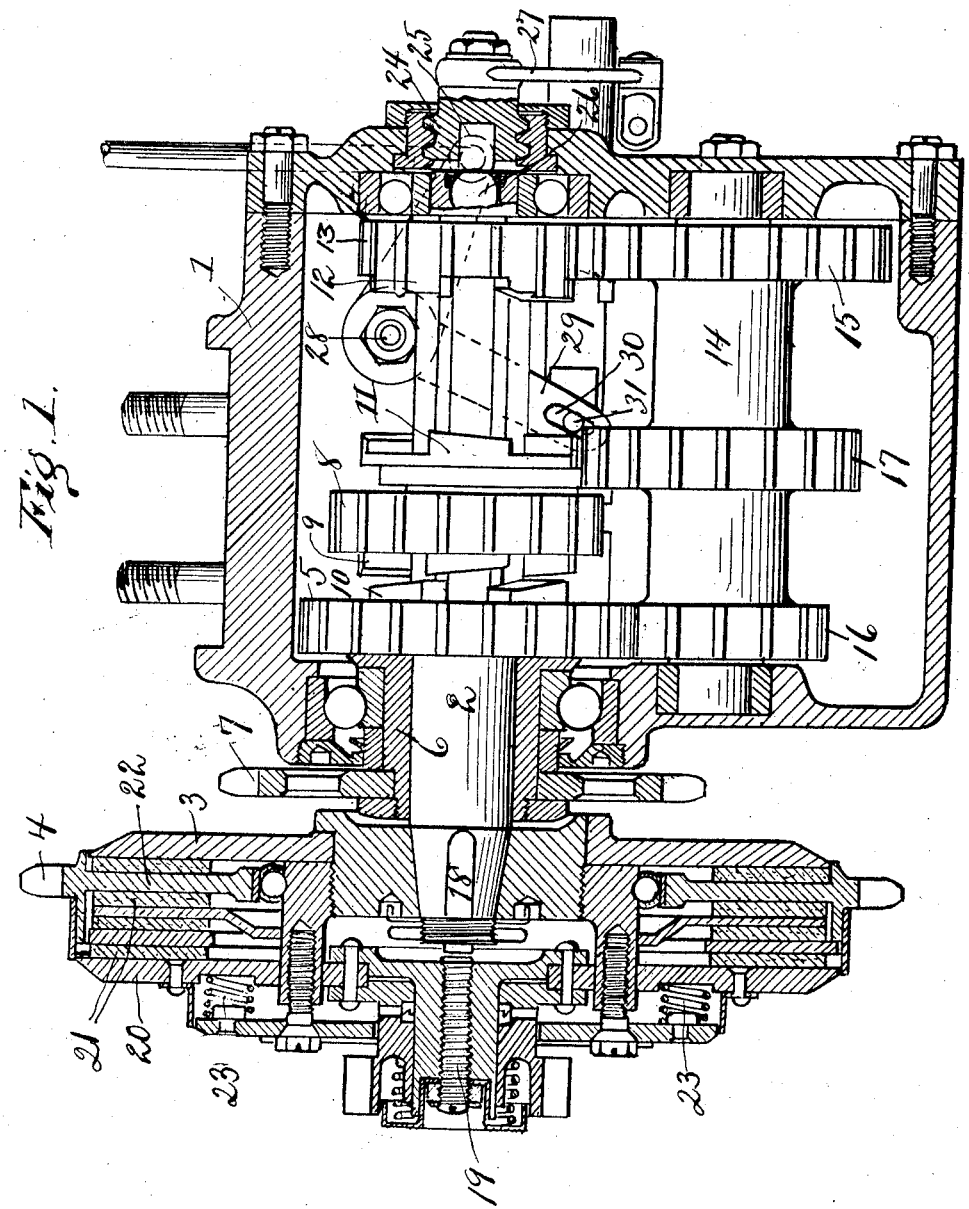

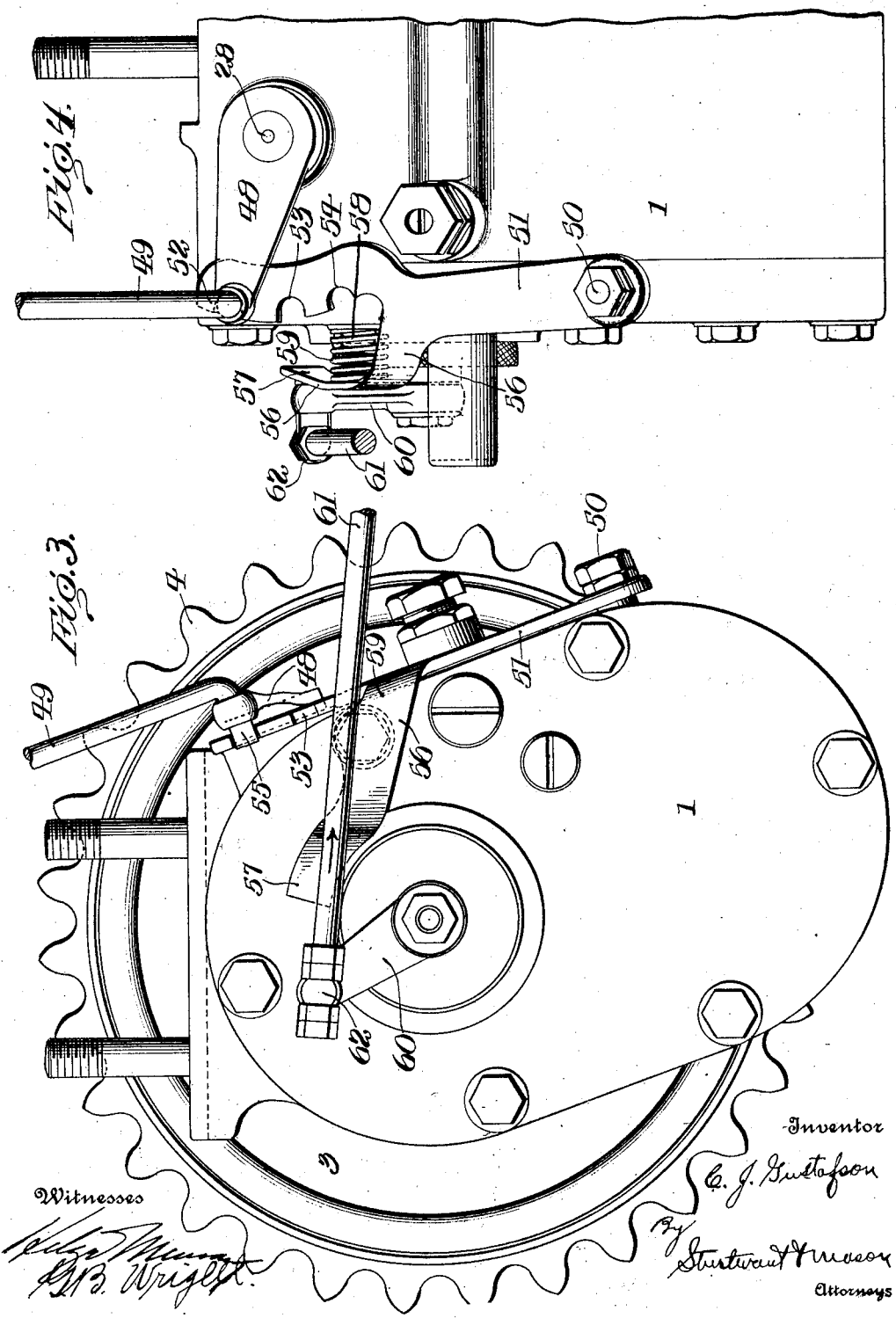

UNITED STATES PATENT OFFICE.

CARL JOHAN GUSTAFSON, OF SPRINGFIELD, MASSACHUSETTS, ASSIGNOR TO HENDEE MANUFACTURING COMPANY, OF SPRINGFIELD, MASSACHUSETTS, A CORPORATION OF MASSACHUSETTS.

GEAR-SHIFT-LEVER LOCK.

1,331,759.  Specification of Letters Patent.  Patented Feb. 24, 1920.

Application filed December 19, 1914. Serial No. 878,117.

*To all whom it may concern:*

Be it known that I, CARL JOHAN GUSTAFSON, a subject of the King of Sweden, residing at Springfield, in the county of Hampden, State of Massachusetts, have invented certain new and useful Improvements in Gear-Shift-Lever Locks, of which the following is a description, reference being had to the accompanying drawing and to the figures of reference marked thereon.

My invention relates to new and useful improvements in gear shift lever locks.

An object of the invention is to provide a gear shift lock which prevents the gears from being shifted from one speed to another while the clutch is engaged and thus greatly relieves the gear of the strain to which they are usually subjected and absolutely prevents the stripping of the gears.

Another object of my invention is to provide a device of this character, in which provision is made whereby the gear shift is positively locked at either high, low or intermediate and also at neutral, and thus prevents the operation of the gear shift while the clutch is engaged.

A still further object of my invention is to provide a lock of this character having certain details of structure and arrangement of parts hereinafter more fully set forth.

In the accompanying drawings:—

Figure 1 is a vertical sectional view of a sliding gear transmission and clutch, showing the gear shift lever to which my invention is to be applied;

Fig. 2 is an end view of the gear casing, showing my improved gear shift lock and showing the gear shift lever released;

Fig. 3 is an end view similar to that shown in Fig. 2, showing the gear shift lever locked;

Fig. 4 is a side view of the gear casing and showing the gear shift lever locked by my improved device: and Fig. 5 is a perspective view of the clutch, arm, lock and gear shift lever in their disassembled relation.

Referring now to the drawings, 1 represents the gear casing of my improved sliding transmission and has rotatably mounted therein the shaft 2 which extends beyond the end of the casing. The end of the shaft 2 has rigidly mounted thereon the clutch 3, which is adapted to rotate with the shaft and power is transmitted from the clutch to the gears in the casing. The sprocket wheel 4 is driven by a chain from the engine and by the friction clutch drives the shaft 2. Loosely mounted on the shaft 2 and adjacent the end of the casing is a gear 5, with its hub 6 extending outwardly beyond the casing and rigidly secured thereon is the sprocket 7, over which passes the chain which passes rearwardly over the sprocket carried by the rear hub of the vehicle and by means of which it is driven. The gear 5 is at all times the driving gear for the sprocket 7, as will be later described.

Slidably mounted upon the shaft 2, beyond the gear 5, is a second gear 8, which is adapted to at all times rotate with the shaft 2, yet it is free to move longitudinally thereon. One face of the said gear is provided with beveled lugs 9 which are adapted to interlock with the beveled lugs 10 carried by the gear 5 and by which the rotary motion of the shaft 2 is directly imparted to the gear 5, and is the high speed. The opposite face of the gear 8 is provided with beveled lugs 11. adapted to engage the beveled lugs 12 of the gear 13 and by which the gears 8 and 13 are locked together. This gear 13 is rotatably mounted upon the shaft 2 and is held against longitudinal movement on the said shaft. Mounted within the lower end of the casing 1 is a shaft 14. having a gear 15 keyed at one end, which at all times meshes with the gear 13. The opposite end of the shaft 14 is provided with a gear 16, which at all times meshes with the gear 5 and is keyed upon the shaft 14. Located midway between the gears 15 and 16 and keyed on the shaft 14 is a gear 17 which is adapted to mesh with the gear 8 and represents the intermediate speed. Longitudinally passing through the shaft 2 is a pin 18, which is adapted to engage the member 19 for forcing the member 20 outwardly and thus allows the friction disks 21 to disengage the annular portion 22 of the sprocket 4. The friction disks 21 are normally held in engagement with the annular portion 22 of the sprocket 4 by means of the strong coil springs 23. The pin 18 is longitudinally moved through the shaft 2 by means of the worm 24. This worm has a plug 25 which engages a ball 26. which bears against the pin 18. and by operating the worm 24 to the right. it will be seen that the engagement of the ball 26 with the pin 18 forces the same into engagement with the member 19 and forces the member 20 outwardly and thus relieves the pressure of the friction disks on the sprocket 4 and allows the same to rotate independently of the clutch 3.

The shaft 2 being continuously rotated, it will be seen that when the gear 8 is moved into central position, it will engage the gear 18 and drive the same, and, through the medium of the gear 16, drives the gear 5, which carries the sprocket 7, whereby the sprocket 7 is driven. This represents the intermediate speed. When the gear 8 is moved so that the lugs 11 engage the lugs 12 of the gear 13, the said gear 13 drives the gear 15, and, through the medium of the shaft 14 and the gear 16 carried thereby, the gear 5 is driven which carries the sprocket 7 and thereby drives the sprocket. This is the low speed.

The worm 24 carries a lever 27, by means of which the clutch is thrown into or out of engagement for releasing the sprocket 4.

Extending into the casing 1 is an oscillating shaft 28 carrying an arm 29 having an elongated slot 30 at its lower end through which extends a pin 31 carried by the extension on the gear 8. By the oscillation of this shaft 28, it will be seen that the gear 8 is either locked directly to the shaft 5 for the high speed; or brought into a position meshing with the gear 17 for the intermediate speed; or into the position where it is locked with the gear 13 for low speed.

The gear shaft 28 is provided with an arm 48, to which is attached the gear shift rod 49. Pivoted to the bolt 50 and carried by the gear casing 1, is an arm 51, having at its upper end the notches 52, 53 and 54 which are adapted to receive the stud 55 carried by the gear shift arm 48 and by which the gear shift arm is locked against movement. The arm 51 is provided with an outwardly extending portion 56, which is turned laterally, as indicated at 57, and forms a cam face which extends approximately parallel with the end of the gear casing 1. Carried by this gear casing 1 is a stud 58 around which is arranged a coil spring 59, which has its outer end bearing against the inner face of the cam extension 57, as fully shown in Fig. 4 of the drawings. The clutch arm 60 has an operating rod 61 secured thereto at 62 and is adapted to engage the cam face 57 of the extension 56 and force the same inwardly against the tension of the spring 59 and throw the arm 51 into such a position that the notches 52, 53 and 54 are away from the stud 55 and thus the arm 48 of the gear shift shaft 28 is free to be moved through the medium of the rod 49. When the gear clutch rod 61 has been brought into the position shown in Fig. 2 of the drawings and the gear shifted to the proper speed, the clutch rod 61 is moved backwardly in the position shown in Fig. 3 and the spring 59 forces the extension 56 to the left, as shown in Fig. 4, and causes the stud 55 to enter one of the notches 52, 53 and 54 and the gear shift shaft 28 is locked against movement.

From the foregoing description, it will be seen that when the clutch is engaged, the rod 61 is in the position shown in Fig. 3 of the drawings and when the rod is moved in the direction of the arrow, Fig. 3, the connection between the clutch arm 60 and the rod 61 engages the laterally turned portion 57 of the outwardly extending portion 56 and forces it inwardly and causes the notches carried by the arm 51 to move away from the stud 55 and thus the shifting lever arm 48 is free to be moved. When the proper speed is reached the rod 61 is moved in the opposite direction from the arrow shown in Fig. 3, which releases the laterally turned portion 57 and allows the spring 59 to force the member 51 to the left, Fig. 4, and causes one of the notches 52, 53 and 54 to surround the stud 55 and thus the gear shift shaft is locked against movement while the clutch is engaged.

Having thus described my invention, what I claim as new and desire to secure by Letters Patents, is:

1. In a device of the character described, the combination with a transmission, of a gear shift lever for said transmission, a clutch lever, a spring pressed lock for said gear shift lever and independent of the clutch lever, and means operated by the clutch lever for releasing said spring pressed lock, whereby the gear shift lever can be operated after the clutch is thrown out of operation.

2. In a device of the character described, the combination with a three-speed transmission, of a shift lever for the said transmission, spring pressed means for locking said shift lever in any of the three speeds or at a point intermediate the three speeds and independent of the clutch lever, a clutch operating device, and means operated by the clutch operating device for releasing the locking means when the clutch is thrown out of operation.

3. In a device of the character described, the combination with a three speed sliding transmission, of a gear shift mechanism for said transmission, spring pressed means for locking the gear shift mechanism in any of the three speeds and also at a point intermediate the speeds and independent of the clutch lever, a clutch operating device, and means operated by the movement of the clutch operating device for releasing the locking means when the clutch is thrown out of operation.

4. In a device of the character described, the combination with a transmission, of a gear shift lever therefor having a projecting stud thereon, a clutch lever, a spring-pressed lock for said gear shift lever independent of the clutch lever and provided with a series of locking notches adapted to be engaged by said stud, means operated by the clutch lever for releasing said spring-pressed lock from said stud whereby the gear shift lever can be operated after the clutch is thrown out of operation.

5. In a device of the character described, the combination with a sliding transmission, of a gear shift lever for said transmission, a stud carried by the gear shift lever, a pivoted member adjacent the gear shift lever and having notches adapted to receive the stud carried by the gear shift lever, an outwardly extending arm carried by the pivoted member, a spring engaging said arm and normally holding the said member in a position with one of the notches surrounding the stud carried by the gear shift lever, a clutch operating rod and means carried by the clutch operating rod for engaging the arm for forcing the pivoted member inwardly to bring the notches out of engagement with the stud whereby the gear shift lever can be operated when the clutch is thrown out of operation.

6. In a device of the character described, the combination with a transmission, of a pivoted gear shift lever, a clutch, a clutch lever pivoted at right angles to the pivoted gear shift lever, a lock pivoted parallel with the pivot of the gear shift lever and engaging the same, and means operated by the clutch lever for operating the lock when the clutch is thrown out of engagement.

7. In a device of the character described, the combination with a transmission, of a pivoted gear shift lever, a clutch, a clutch operating rod, a pivoted member adjacent the gear shift lever and adapted to lock the same, an outwardly extending arm carried by the pivoted member and normally held in the path of travel of the clutch rod and whereby the clutch rod engages the arm and moves the pivoted member out of engagement with the gear when the clutch is thrown out of operation.

8. In a device of the character described, the combination with a transmission, of a pivoted gear shift lever, a clutch, a clutch operating lever, a pivoted spring-held member adjacent the gear shift lever and having its pivot parallel with the pivot of the gear shift lever and adjacent thereto, and means carried by the pivoted member for locking the gear shift lever and adapted to be moved out of engagement with the gear shift lever by the clutch operating lever when the clutch is thrown out.

9. In a device of the character described, the combination with a transmission, of a pivoted gear shift lever, a clutch, a clutch operating lever pivoted at right angles to the gear shift lever, a spring-held member adjacent the gear shift lever and having its pivot parallel with the pivot of the gear shift lever and adjacent thereto, and means carried by the pivoted member for locking the gear shift lever and adapted to be moved out of engagement with the gear shift lever by the engagement of the clutch operating lever when the clutch is thrown out.

10. In a device of the character described, the combination with a transmission, of a pivoted gear shift lever, a clutch, a clutch operating lever, a spring held member adjacent the gear shift lever and adjusted to move in the same plane as the gear shift lever, and means carried by the spring held member for locking the gear shift lever, and adapted to be moved out of engagement with the gear shift lever by the clutch operating lever when the clutch is thrown out.

In testimony whereof I affix my signature in the presence of two witnesses.

CARL JOHAN GUSTAFSON.

Witnesses:
JOHN D. STEPHENS,
P. J. KELLY.